United States Patent [19]

Yan

[11] Patent Number: 5,635,078
[45] Date of Patent: Jun. 3, 1997

[54] REJUVENATED CATALYTIC OXIDATION OF WASTE WATER, PARTICULARLY FOR REMOVAL OF CYANIDE AND SULFUR COMPOUNDS

[75] Inventor: Tsoung Y. Yan, Pennsylvania, Pa.

[73] Assignee: Mobil Oil Corporation, Fairfax, Va.

[21] Appl. No.: 227,749

[22] Filed: Apr. 13, 1994

Related U.S. Application Data

[63] Continuation-in-part of Ser. No. 61,127, May 12, 1993, Pat. No. 5,338,463.

[51] Int. Cl.$^6$ ........................................... C02F 1/72
[52] U.S. Cl. ........................ 210/763; 210/904; 210/903; 210/908
[58] Field of Search .............................. 210/762, 763, 210/904, 908, 909, 903

[56] References Cited

U.S. PATENT DOCUMENTS

| | | | |
|---|---|---|---|
| 3,510,424 | 5/1970 | Zumbrunn et al. | 210/63 |
| 3,586,623 | 6/1971 | Kuhn | 210/763 |
| 3,650,949 | 3/1972 | Hager et al. | 210/36 |
| 4,537,686 | 8/1985 | Borbely et al. | 210/763 |
| 4,569,769 | 2/1986 | Walton et al. | 210/759 |
| 5,120,453 | 6/1992 | Frame et al. | 210/759 |
| 5,207,925 | 5/1993 | Steiner et al. | 210/746 |
| 5,273,663 | 12/1993 | Kurek et al. | 210/763 |
| 5,290,455 | 3/1994 | Rakszawski | 210/763 |
| 5,338,463 | 8/1994 | Yan | 210/763 |
| 5,360,552 | 11/1994 | Yan | 210/763 |
| 5,376,285 | 12/1994 | Kurek et al. | 210/763 |

*Primary Examiner*—Neil McCarthy
*Attorney, Agent, or Firm*—A. J. McKillop; D. P. Santii; G. L. Harris

[57] ABSTRACT

The rejuvenative catalytic oxidation of offensive substances, such as cyanides, sulfides, sulfites, thiosulfates, mercaptans, disulfides, ammonia and mixtures thereof, contained in waste water. The process involves the addition of a low concentration of a metal compound to the waste water to be treated and then passing the waste water along with a source of oxygen over an adsorbent material, thus catalytically oxidizing the offensive substances contained in the waste water. The process reduces the catalytic impact of the loss of metal from the adsorbent material due to leaching and allows the catalyst to be rejuvenated and allows recovery from process upsets in the treating system without unit shutdown and catalyst replacement. An example of the catalytic support is activated carbon and an example of the metal is copper.

27 Claims, 3 Drawing Sheets

REJUVENATED CATALYTIC OXIDATION OF WASTE WATER, PARTICULARLY FOR REMOVAL OF CYANIDE AND SULFUR COMPOUNDS

CROSS REFERENCE TO RELATED APPLICATIONS

This is a Continuation-In-Part of, allowed U.S. application Ser. No. 08/061,127, filed May 12, 1993, now U.S. Pat. No. 5,338,463 which is incorporated herein by reference.

FIELD OF THE INVENTION

This invention is directed to reducing the concentration of offensive substances and to reducing the chemical oxygen demand of waste water by oxidizing various offensive substances including, for example, cyanides, sulfides, sulfites, thiosulfates, mercaptans, disulfides, ammonia and mixtures thereof using a rejuvenative catalytic oxidation system which is operable without emitting undesirable amounts of catalytic material into the treated water. It is particularly directed at using a metal compound, such as copper, and an adsorbent substrate, such as activated carbon, to catalytically oxidize waste water containing the above described offensive substances and potentially containing ammonia.

BACKGROUND OF THE INVENTION

Waste water streams from industrial plants, including petroleum refineries, chemical plants, pulp and paper plants, mining operations, electroplating operations, and food processing plants, can contain offensive substances such as cyanides, sulfides, sulfites, thiosulfates, mercaptans, disulfides, ammonia and mixtures thereof, that tend to increase the chemical oxygen demand (COD) of the waste water streams. Examples of these waste water streams in petroleum refineries include sourwater, sourwater stripper bottoms, and spent caustics and the term "waste water" is used herein to refer to the above described streams.

The Environmental Protection Agency (EPA) and various local agencies have placed limits on the allowable levels of these offensive substances in industrial waste water effluent streams. It is desired to develop a process suitable for treating these streams to meet the regulatory limits.

Methods for COD reduction by reducing the concentration in the waste water of one or more of these compounds include treatment of the waste water by precipitation, incineration, biological oxidation, and chemical oxidation using peroxoacids, $H_2O_2$, $Cl_2$, NaOCl, $ClO_2$, and $KMnO_4$, among others. Catalysts containing metals, such as copper, manganese, nickel, cobalt, tungsten, and chromium, among others, either in a soluble form or in a supported or complexed form, have also been mentioned as useful for waste water oxidation. It is also known that the addition of $SO_2$ type compounds, such as $SO_2$, alkali and alkaline earth sulfites and bisulfites, and related compounds to the waste water enhances the catalytic oxidation of cyanide, but also increases the oxygen requirements of the total COD reduction system. The concentration of the cyanide or other offensive substance in the waste water may be too low to treat economically using conventional means, but still too high to meet effluent limitations. other problems with conventional waste water treatment processes for streams having relatively low concentrations of offensive substances include high cost, high severity, and the potential for the introduction of undesirable substances into the treated waste water, such as intentionally added $SO_2$ type compounds and the soluble metal catalysts mentioned above. Even where water insoluble metal catalysts are used, a relatively small ammonia concentration in the waste water tends to form ammonia-metal complexes and to leach the metal from the catalyst into the treated waste water. Also, many of the previously known processes for waste water oxidation may be intolerant of process upsets, for example, significant pH changes may destroy the catalyst, possibly through leaching, precipitation, or destruction of the physical integrity of the catalyst.

For the above reasons, it is desired to develop an inexpensive, mild, catalytic waste water oxidation process that is effective to remove low concentrations of offensive substances and is sufficiently robust to allow recovery from process upsets without replacement of the catalyst. More specifically, it is desired to develop a rejuvenative, inexpensive process to catalytically oxidize low concentrations of offensive substances which leaves a low concentration of metal compound in the treated waste water.

SUMMARY OF THE INVENTION

A treatment method has now been discovered for waste water in which many offensive substances, including cyanides, sulfides, sulfites, thiosulfates, mercaptans, disulfides, ammonia and mixtures thereof, that increase waste water chemical oxygen demand (COD) are found. The process catalytically oxidizes the materials using a source of oxygen, an adsorbent substrate having a high surface area, and a compound which is effective to catalyze oxidation of the offensive substances.

The invention generally provides a method for treating waste water comprising directing a source of oxygen and a waste water containing at least one offensive substance selected from the group consisting of cyanide, sulfide, sulfite, thiosulfate, mercaptan, disulfide, ammonia and mixtures thereof over a high surface area, porous material in a reaction zone, thereby producing a treated waste water. The porous material should have less than about 10,000 parts per million, ppm, of a metal compound thereon. The metal compound should be one that is effective to catalyze the oxidation in waste water of the offensive substance. The reaction zone should be operated under conditions effective to reduce the concentration of the offensive substance contained in the waste water, for example, the conditions may include a temperature of from about 100° F. to about 400° F. and a pH of from about 6 to about 14. An amount sufficient to maintain a concentration of the metal compound mentioned above in the treated waste water at a level less than about 5 ppm, specifically between about 1 ppm and about 0.001 ppm, is added either continuously or intermittently to the waste water prior to directing it into the reaction zone. The treated waste water is discharged from the reaction zone.

The invention particularly provides a method for treating waste water comprising directing a source of oxygen and a waste water containing at least one offensive substance selected from the group consisting of cyanide, sulfide, sulfite, thiosulfate, mercaptan, disulfide, ammonia and mixtures thereof, over an activated carbon having less than about 1 to about 5,000 ppm of copper thereon in a reaction zone, thereby producing a treated waste water. The reaction zone should be operated under conditions effective to reduce the concentration of the offensive substance contained in the waste water, for example, the conditions may include a temperature of from about 120° F. to about 250° F. and a pH of from about 8 to about 13. A sufficient amount of a soluble form of copper is added either continuously or intermittently to the waste water prior to directing it into the reaction zone to maintain a concentration of copper on the adsorbent at a level up to about 5,000 ppm, and in the treated waste water at a level between about 1.0 ppm and about 0.001 ppm. Then the treated waste water is discharged from the reaction zone.

DETAILED DESCRITION OF THE INVENTION

The invention is a process for reducing the concentration of offensive substances and for oxidizing COD causing materials, including, for example, cyanide, sulfide, sulfite, thiosulfate, mercaptan, disulfide, ammonia and mixtures thereof from waste water in the presence of a source of oxygen through the use of an adsorbent substrate and a compound effective to catalyze oxidation of the offensive substances. The process is economically advantageous because it employs a long lasting adsorbent/catalyst which effectively oxidizes the materials at mild conditions, and which may be rejuvenated while in operation and which permits a single catalytic process to replace several other processes. An advantage of the process of this invention is that if the catalytic metal is removed or leached from the adsorbent, thus reducing the catalytic activity, small amounts of catalytic metal in solution may be added to rejuvenate the system and to restore the catalytic activity.

The process of this invention is also effective to treat other cyanide containing streams, such as sour water produced from a fluid catalytic cracking, FCC, unit. Also, the water condensate products from FCC overhead accumulators and wet gas compressor high pressure receivers can contain more than 100 ppm cyanides. This cyanide concentration can cause severe cyanide corrosion of the equipment. Currently, polysulfide is typically added to convert the cyanide ($CN^-$) to thiocyanate ($SCN^-$) to reduce or eliminate the corrosion problem. $SCN^-$ remains in the waste water. Even though it is not currently regulated, the presence of $SCN^-$ in the waste water increases the sulfur and nitrogen concentration in the waste water. It is desirable to convert the high levels of cyanide in this type of product stream to innocuous compounds. This type of product stream is also included in the "waste water" streams that may be treated by the method of this invention.

Cyanides exist in waste water in both free and complexed forms. Metal complexed cyanide is frequently so stable that direct oxidation is impossible. Even processes using hydrogen peroxide and a homogeneous catalyst may be unable to oxidize metal complexed cyanides due to short residence times. Without intending to be bound thereby, it is believed that the metal complexed cyanide must dissociate before it can be oxidized. Through the use of heterogeneous copper containing adsorbent catalysts, such as those disclosed in this invention, the effective residence time of the complex on or in contact with the catalyst can be greatly increased. Without intending to be bound thereby, it is believed that the complexed cyanide is adsorbed onto the catalyst surface and thus selectively retained in the system so that its actual residence time may be as much as 500 to 1,000 times that of the homogeneous system. With this long residence time, the metal cyanide complex may be dissociated slowly to provide $CN^-$ for oxidation. A representation for the dissociation and oxidation of an iron cyanide is given below:

$$2\ CN^- + O_2 \rightarrow 2\ CNO^-$$

$$2\ CNO^- + O_2 \rightarrow CO_2 + N_2$$

Thus, unlike the homogeneous system which is limited by the dissociation rate of the metal complexed cyanide, and thus is ineffective for removing the metal complexed cyanide, the heterogeneous catalytic system of this invention is capable of removing both free and complexed cyanides.

The process of this invention comprises passing the waste water to be treated along with a source of oxygen over a porous, high surface area adsorbent in a reaction zone. The adsorbent, when combined with a metal compound which is effective to catalyze oxidation of the offensive substances mentioned above produces a heterogeneous catalyst useful in this invention. After some of the metal compound has been stripped or leached off the adsorbent, additional metal compound may be added to the waste water to rejuvenate the system. This additional metal compound may be added continuously or intermittently, as desired. The metal compound may be present in the adsorbent as it is produced or manufactured or it may be intentionally added to activate the catalyst for the process of this invention. Addition of the metal compound to the adsorbent may be done in any suitable fashion, for example, by impregnation, ion-exchange, or in other effective ways. The metal compound may also be added to a solvent or to the waste water and then directed over the catalyst in the reaction zone to achieve an in-situ catalyst activation or the catalyst may be activated outside the reaction zone. Naturally, the concentration of the metal compound in the solvent or in the waste water used for activation is typically higher than the concentration of metal compound used for rejuvenation of the catalyst, but the higher concentration is not required. The concentration of the metal compound in the solvent or the waste water that is used for rejuvenation is typically limited or restricted to meet the desired metal specification in the effluent water. For minimizing the metal content in the effluent water, the continuous rejuvenation technique is preferred.

Adsorbent Substrate

Figure 1:
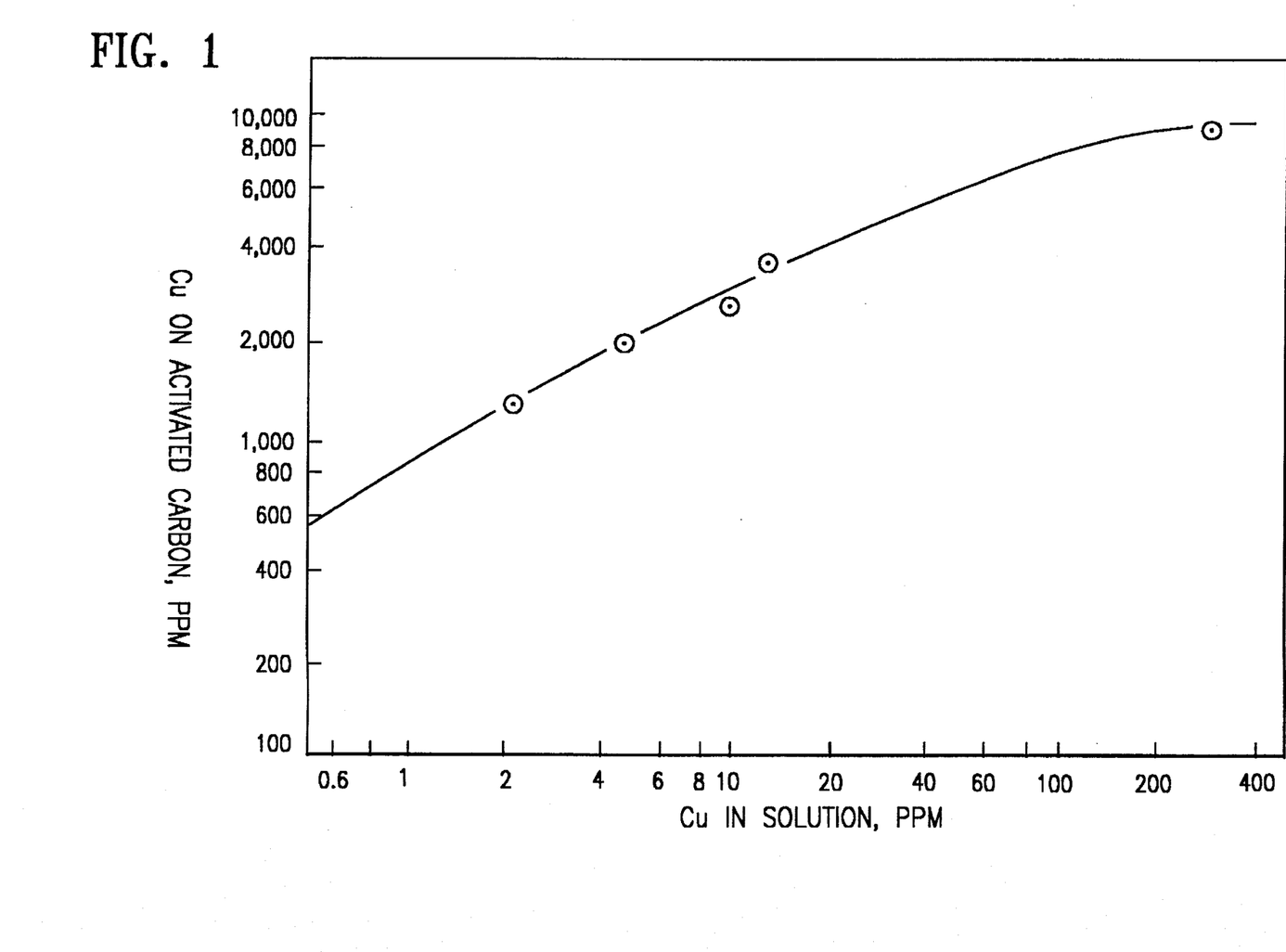
FIG. 1 is a graph showing the equilibrium absorption curve of copper in water on activated carbon.

Many porous, high surface area materials are suitable for use in this invention. Preferred materials are those capable of adsorbing and concentrating soluble metal compounds and the offensive compounds, such as cyanide, sulfides, and thiosulfate, from water. Each adsorbent useful in this invention has associated with it a high adsorption equilibrium for the catalytic metal and for the offensive compound that effectivly concentrates the material on the adsorbent over the level of that material in the water. Preferred adsorbents for this invention are those that generally concentrate the metal compound over about 10 times the concentration of the metal compound in the water, specifically over about 100 times, more specifically over about 500 times, most specifically about 700 to 1,000 times or more. FIG. 1 shows an equilibrium adsorption curve for copper on activated carbon. This equilibrium adsorption curve was prepared by the following method.

Equilibrium Adsorption Curve

A base copper solution was prepared by dissolving 0.2 N cupric nitrate, $Cu(NO_3)_2$, in water with 200 ppm ammonia, NH₃. Test solutions having the desired concentration of copper solution were prepared by diluting the base copper solution with water. Two grams of Calgon CAL™ activated carbon were added to 20 cc of each of the test solutions and were equilibrated for 16 hours at 80° F. The activated carbon was recovered from the solution and dried at 230° F. Copper concentration of the dried activated carbon was determined by atomic absorption (AA) and the copper concentration of the equilibrium test solutions was also determined using the AA method.

As can be seen in FIG. 1, about 1 ppm copper in water is estimated to be in equilibrium with about 800 ppm copper on activated carbon. In a steady state operation, a make-up rate of 1 ppm soluble copper in waste water should result in a concentration of about 800 ppm copper on an activated carbon catalyst and, also, a concentration of about 1 ppm copper in the treated waste water. Copper concentrations higher than about 800 ppm on activated carbon would tend to result in copper concentrations higher than about 1 ppm in the treated waste water.

It should be recognized that the adsorption equilibrium for any given metal compound on an adsorbent may vary depending on the temperature and other properties of the system. For example, higher ammonia concentrations in water tend to increase the metal-ammonia complex concentration in the water, thus allowing a higher leach rate of the metal from the adsorbent and leading to a lower concentration effect for the metal on the adsorbent.

The enhanced concentration of the metal compound on the adsorbent due to the concentration effect is an important feature of this invention. This concentration effect allows the use of a low concentration of metal compound in the waste water to maintain a heterogeneous catalyst that is effective for the oxidation of offensive substances in waste water. The concentration of the metal compound on the adsorbent also tends to keep the metal concentration in the treated water lower to meet the desired discharge specification. In the example given above, the activated carbon can be used to increase the copper concentration on the adsorbent surface to levels adequate to catalyze the oxidation reactions in the dilute solution. A concentration of about 500 ppm copper on the activated carbon is believed to be high enough to be catalytically active. Using selected adsorbents in the manner of this invention, the treated waste water effluent will contain low concentrations of the metal compound, which was added to the waste water, and will meet the desired discharge specification for the concentration of the metal in the treated water, while the adsorbent will contain a sufficiently high level of the metal compound to be effective to catalyze the oxidation of the offensive substances.

As mentioned above, other porous, high surface area adsorbents also are capable of adsorbing an equilibrium amount of a soluble metal from the waste water and are suitable in the process of this invention. Non-limiting examples of these other adsorbents include natural and synthetic zeolites, alumina, silica, and silica-alumina. Natural zeolites include chabazite, clinoptilolite, erionite, and mordenite. Examples of synthetic zeolites include Zeolite A (U.S. Pat. No. 2,882,243); Zeolite X (U.S. Pat. No. 2,882,244); Zeolite Y (U.S. Pat. No. 3,130,007); ZSM-5 (U.S. Pat. No. 3,702,886 and U.S. Pat. No. Re. 29,948); ZSM-11 (U.S. Pat. No. 3,709,979); ZSM-12 (U.S. Pat. No. 3,832,449); ZSM-21 (U.S. Pat. No. 4,046,859); ZSM-22 (U.S. Pat. No. 4,556,477); ZSM-23 (U.S. Pat. No. 4,076,842); ZSM-35 (U.S. Pat. No. 4,016,245); ZSM-38 (U.S. Patent No. 4,406,859); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein.

Other useful porous materials include the ion-exchange resins and the porous resins that have not been impregnated with the active material needed to make them suitable as ion-exchange resins. Examples of suitable ion-exchange resins include those identified by the following tradenames: Allassion A33-03, Amberlite IRA-45, Amberlite IRA-93, De-Acidite G, De-Acidite M, Dowex 3, Imac A-20, Imac A-21, Ionac A-315, Lewatit MP-60, Allassion AWB-3, Anionite EDE-10P, Anionite AV-16, Dowex 44, Duolite A-30B, Duolite A-57, Imac, Ionac A-300, Ionac A-310, Wofatit L-150, Anionite AN-2F, De-Acidite E, Duolite A-6, Duolite A-7, Lewatit MIH 59, Wofatit MD, Allassion CC, Amberlite IRC-50, Amberlite IRC-84, Dowex CCR-1, Duolite ES-63, Duolite ES-80, Duolite CS-100, Duolite CS-101, Imac Z-5, Ionac C-270, Kastel C-100, Lewatit CNO, Wofatit CP-300, Wofatit CN, Zeo-Karb 216, Zeo-Karb 226, Dowex 21K, Dowex MS-1, Amberlite IRA-400, Amberlite IRA-900, Amberlite IRA-910, Ionac A-540, Ionac A-641, Amberlite IR-120, Amberlite IR-200, Amberlist-15, Amberlist-1010, Dowex 50, Ionac A-380, Ionac C-240, Ionac C-249, and Ionac C-253. These resins are variously described in U.S. Pat. Nos. 5,292,493 and 4,795,565, incorporated by reference herein.

Particularly useful adsorbent materials include graphite and the various charcoals produced by the destructive distillation of wood, peat, lignite, bituminous coal, nutshells, bones, and other carbonaceous matter, and preferably such bituminous coals and charcoals as have been heat-treated or chemically treated or both, to form a highly porous particle structure of increased adsorption capacity, and generally defined as activated carbon or charcoal. Any particular solid adsorbent material is selected for use in the process of this invention with regard to its chemical and physical stabilities under conditions of intended use. With regard to its intended use in aqueous systems, perhaps the most important property of the adsorbent support is its adsorption capability as well as unreactivity in the aqueous systems. Charcoal, and particularly activated carbon or charcoal is preferred because of its high adsorption capacity and because of its stability under treating conditions.

Activated carbon is commonly available in forms that are identified by the manufacturers as suitable for use in vapor phase applications, e.g., ATOCHEM™ CECARBON™ GAC 616 G and Calgon BPL™, and as suitable for use in liquid phase applications, e.g., ATOCHEM™ CECARBON™ GAC 830 and Calgon CAL™. Due to higher hardness and increased abrasion resistance, carbon designated for vapor phase applications is generally preferred for use in the method of this invention in spite of the fact that the present invention concerns a liquid phase operation. Other activated carbons from the same manufacturers that may be useful in the process of this invention include ATOCHEM™ CECARBON™ AW 830 and Calgon C™.

A packed bed provides an effective and efficient contactor. In the packed bed, the reaction zone proceeds along the direction of flow. To minimize the pressure drop across the bed and alleviate potential plugging by debris, the reactor can be operated with the bed expanded slightly, but with less than about 20% expansion. The reactor also can be operated at conditions for an ebullient bed, a fluidized bed, a spouting bed, or in a slurry operation. The use of filters or guard beds may also be helpful to avoid plugging the catalyst bed due to debris.

The form and the particle size of the support are not critical to the present invention and may vary depending, for example, on the type of reaction system employed. Non-limiting examples of the shapes of the adsorbent for use in the present invention include granules, balls, pebbles, spheres, beads, extrudates, channeled monoliths, microspheres, pellets or structural shapes, such as lobes, pills, cakes, powders, and the like, formed using conventional methods, such as extrusion or spray drying. Preferred shapes include granules, beads, balls, pebbles, spheres, extrudates, microspheres, pellets, and structural shapes. Where, for example, the final particles are designed for use as a fixed or expanded bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed operations. With regard to fluidized bed systems, it is preferred that the major amount by weight of the particles have a diameter in the range of about 10 microns to about 5,000 microns, more preferably about 20 microns to about 1,000 microns.

Catalytic Metals

Metal compounds useful in the process of this invention are those which are active to oxidize the offensive substances contained in the wastewater. Non-limiting examples of these metals include copper, nickel, cobalt, molybdenum, tungsten, silver, palladium, platinum, iron, manganese, and mixtures thereof. These metals are useful in any form that can be dissolved into a suitable solvent or water for injection into the system. For example, ammonia, $NH_3$, can be added to the metal to form water soluble complexes. Examples containing copper include, cupric acetate, cupric chloride, cupric cyanide, cupric sulfate and cupric sulfite, among others. Other water soluble complexes, such as cyano complexes and ammines, are also contemplated. Ammine complexes can be formed by first dissolving the metal in an acid, e.g., aqua regia, and then adding an amine such as ammonium hydroxide, i.e. ammonia solution until the entire solution becomes basic. Alternatively, a salt of the metal can be contacted with an amine solution, e.g., ammonia solution, until the solution becomes basic, to form the square-planar ammine complex.

In the one of the embodiments of this invention, the metal compound is added to and flows with the waste water and is adsorbed by the support in the reaction zone. As described above, the amount of the metal compound that is typically added to the system is that amount which can be adsorbed by the support in equilibrium with the soluble metal in the treated water. In the method of this invention, the rate of addition of the metal compound is not directly related to the concentration of the offensive substances in the waste water.

According to the method of this invention, the metal compound may be added to the waste water either continuously or intermittently. Generally, the metal compound is added to the waste water in a concentration effective to produce a metal concentration in the treated waste water of less than about 5 ppm, specifically less than about 3 ppm, more specifically less than about 1 ppm, still more specifically less than about 0.5 ppm, even still more specifically less than about 0.1 ppm, most specifically less than any local regulatory limit for the metal compound used. As noted above, at equilibrium, the concentration of soluble metal compound in the waste water being treated will be approximately equal to that in the treated waste water. The term "approximately equal" is also intended to cover those situations where an equilibrium has not yet been established between the concentration of soluble metal compound in the waste water and the concentration of the metal compound on the adsorbent. In those situations, the concentration of metal compound in the treated waste water may be substantially different, e.g., by a factor of 5 or 10 or more, from the concentration of metal compound in the waste water feed. Examples of situations where an equilibrium might not exist between the concentration of soluble metal compound in the waste water and the concentration of metal compound on the adsorbent include process start-ups, process upsets, activation of the adsorbent, changes in waste water composition, e.g., a higher or lower concentration of ammonia or some other constituent, and process temperature changes. When the metal content in the treated water exceeds the desired specification, the treated water can be recycled through the process to achieve the desired equilibrium conditions.

While the normal concentration of the soluble metal compound in the waste water to be treated, when in an operation where the metal compound is continuously present in the waste water, is generally expected to be less than about 5 ppm, specifically less than about 3 ppm, more specifically less than about 1 ppm, the process is effective with soluble metal compound concentrations of about 0.5 ppm, specifically about 0.1 ppm. The process of this invention is also effective with intermittent addition of the soluble metal compound to the waste water to be treated. Naturally the concentration of the metal compound in the waste water for intermittent rejuvenation will be higher than the concentration needed for continuous rejuvenation. Again, the concentration of the metal compound in the treated waste water may be used as an indicator.

If desired, the adsorbent may be activated using a relatively high concentration of soluble metal compound in water or another solvent. During the activation of the adsorbent, suitable metal concentrations in the solvent are those which produce the desired metal concentration on the adsorbent in a reasonable time without generation of an excessive amount of contaminated solvent. Examples of metals concentrations that may be useful for adsorbent activation include 1 to 10 bed volumes of solution containing generally about 10,000 ppm, specifically 1000 ppm, more specifically 500 ppm of the metal compound.

Finally, as mentioned above, the adsorbent may be prepared with or already include a suitable concentration of the active metal compound or the active metal compound may be added to the adsorbent in any suitable fashion. For example, Calgon CAL™ activated carbon contains about 9 to 40 ppm copper, while carbons from the American Norit Co., such as the lignite based Darco® carbon, Petrodarco A™ carbon, and the peat based Norit® ROX 0.8 carbon have copper concentrations of about 40 ppm, 69 ppm and less than 9 ppm respectively, and the lignite based Alfa™ carbon, produced by Alfa Products, has a copper concentration of less than 1 ppm.

Process Conditions

As noted above, this invention is useful to reduce low concentrations of offensive substances in waste water streams. By "low concentrations" in these waste water streams is meant total cyanide concentrations (free and complex) generally less than about 200 ppm, specifically less than about 15 ppm, more specifically less than about 10 ppm and sulfur compound concentrations (as S) generally less than about 10,000 ppm, specifically less than about 1,000 ppm, more specifically less than about 100 ppm, and still more specifically less than about 25 ppm. The process of this invention is also effective to treat higher concentrations of cyanide and sulfur compounds. The process of this invention is generally effective to reduce the concentration of total cyanide (free and complex) to less than about 1 ppm, specifically less than about 0.5 ppm, more specifically less than about 0.1 ppm. This reduction in total cyanide concentration generally represents at least an 85 percent reduction, specifically at least a 90 percent reduction, more specifically at least a 95 percent reduction, still more specifically at least a 98 percent reduction and most specifically at least a 99 percent reduction. The process of this invention is also generally effective to reduce the sulfur compound concentration by about 80 percent, specifically by about 90 percent, and more specifically 95%. Reduction in the ammonia concentration in the waste water was also unexpectedly found to be possible at the mild conditions of the process of the instant invention using at least some of the catalytic metals mentioned above, e.g., copper.

Typical reaction conditions for the process of this invention are generally as follows:

| Process Variable | Broad Range | Narrower Range | Narrowest Range |
| --- | --- | --- | --- |
| Pressure, psia | 0 to 1000 | 10 to 200 | 14.7 to 50 |
| Temperature, °F. | 100 to 400 | 125 to 300 | 150 to 250 |
| LHSV*, v/v Hr. | 0.1 to 100 | 1 to 20 | 4 to 10 |
| $O_2$/COD*, mol/mol | 1 to 100 | 1 to 10 | 1 to 5 |
| pH | 6 to 12 | 7.5 to 10.5 | 8 to 10 |
| Metal Concentrations, ppm | | | |
| On adsorbent | <10,000 | 1 to 1,000 | 1 to 800 |
| In feed water | 0 to 5 | 0 to 3 | 0.001 to 1.0 |
| In treated water | 0.001 to 5 | 0.001 to 3 | 0.01 to 0.5 |

*Where LHSV is liquid hourly space velocity and COD is chemical oxygen demand.

Air, readily available, is the preferred source of oxygen or oxidizing agent; however, other agents include ozone and molecular oxygen, $O_2$. Hydrogen peroxide is not contemplated to be intentionally added as a source of oxygen for this process. Also, no intentionally added $SO_2$ type compounds, as described above, are contemplated to be intentionally added in the process of this invention.

The process of this invention is effective with the waste water and the source of oxygen flowing together either upwardly or downwardly through the reaction zone. Also contemplated is a mode where the waste water flows downwardly and the source of oxygen flows upwardly through the reaction zone.

Representations for the mechanisms for the various oxidation processes follow:

1. Oxidation of Cyanides

2. Oxidation of Sulfides

3. Oxidation of Sulfites

4. Oxidation of Thiosulfates

5. Oxidation of Mercaptans

6. Oxidation of Disulfides

All the reaction products are innocuous. The treated water (oxidized effluent) is discharged, while the gas is treated, flared, or incinerated. Any skim oil present can be recovered in an oil-water separator, preferably a separator drum.

EXAMPLE 1

To demonstrate the activation of the adsorbent, 2 cc of Calgon CAL™ activated carbon, crushed to 20 by 40 mesh, was packed into a tubular reactor. Synthetic waste water was prepared containing 100 ppm cyanide (from NaCN), 100 ppm $NH_3$, and 100 ppm $Na_2S$. The synthetic waste water was passed through the reactor at 100° C. and 10 cc/hr along with 1200 cc/hr air. Cyanide concentration in the effluent water was measured using a cyanide ion selective electrode (Orion Research, Model 94-06). A copper solution was prepared of $Cu(NO_3)_2$ containing 0.065 g copper in 10 cc water. After cyanide breakthrough was detected, 0.5 cc of the copper solution was passed through the reactor. Cyanide removal after catalyst activation was 99 percent.

EXAMPLE 2

Figure 2:
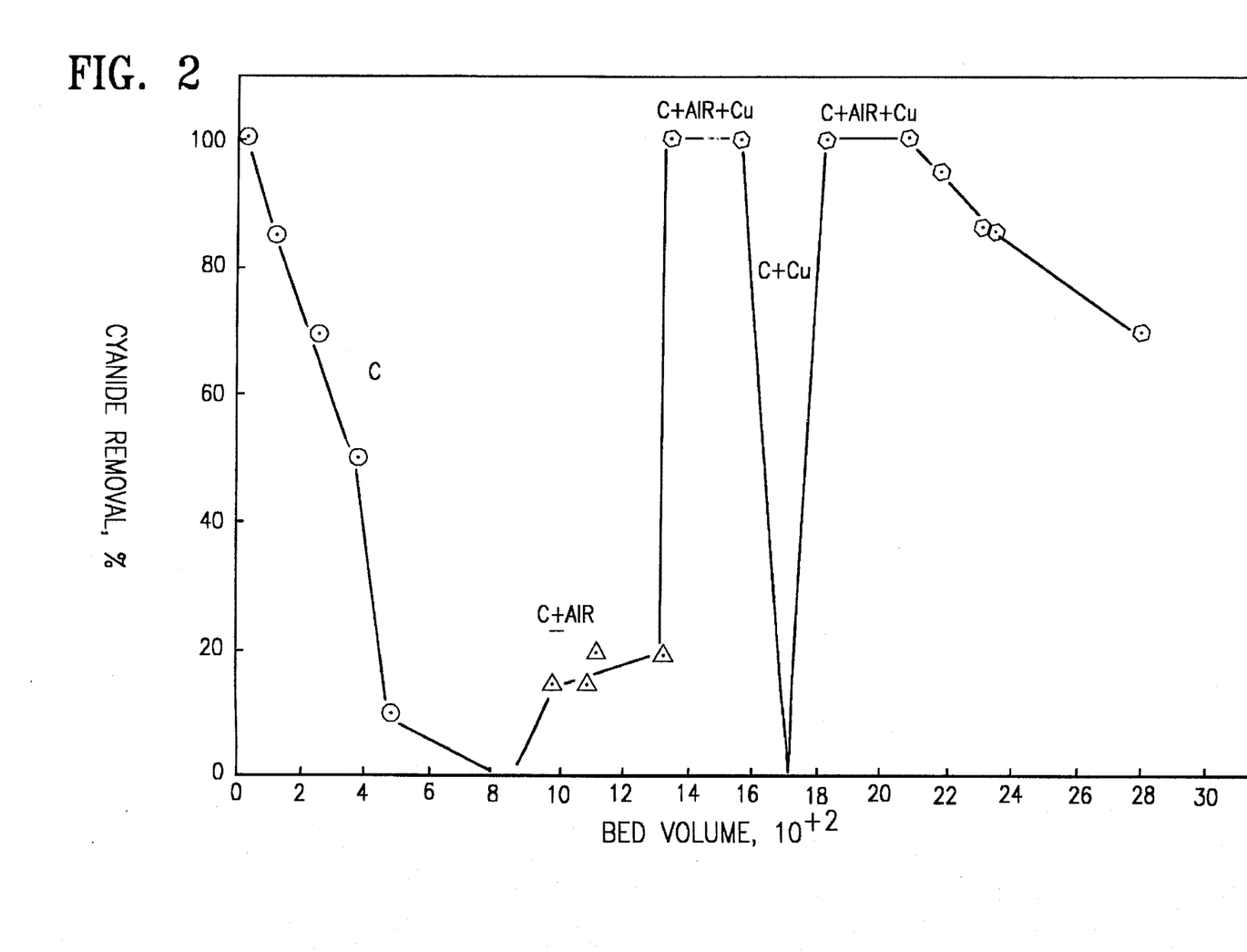
FIG. 2 is a graph demonstrating the effects of various operating parameter changes on cyanide removal efficiency.

In this experiment, 2 cc of Calgon CAL™ activated carbon, crushed to 20 by 40 mesh, was packed into a tubular reactor. Synthetic waste water was prepared from distilled water by adding $NH_4OH$ to a $NH_3$ level of 80 ppm, thiosulfate to a level of 100 ppm and sodium cyanide to a level of 100 ppm. The pH of the synthetic waste water was adjusted to 9. The synthetic waste water containing 100 ppm cyanide was passed through the activated carbon bed at 5 $hr^{-1}$ liquid hourly space velocity (LVSH), 10 cc/hr, and 100° C. Results of this experiment are shown in FIG. 2. Cyanide concentration in the effluent water was measured using a cyanide ion selective electrode (Orion Research, Model 94-06). After about 800 bed volumes of water were passed over the carbon, the cyanide adsorption capacity of the activated carbon was exhausted. Air was then introduced into the water feed and was co-fed with the water while about 400 more bed volumes of water were passed over the carbon. About 15 to 20% cyanide removal was achieved in this mode of operation. After about 1,300 bed volumes of water had passed over the activated carbon, the system was activated by injecting a slug of copper solution into the water. Copper solution was prepared by dissolving $Cu(NO_3)_2$ in distilled water to a level of 0.01 N, then 2 cc of this solution was injected into the water flowing over the activated carbon. Then, the synthetic waste water passing over the carbon catalyst was adjusted to continuously contain 0.01 ppm copper. After the activation of the catalyst system as described above, the cyanide removal increased to near 100%. Then, after about 1,700 total bed volumes of water had passed over the activated carbon, the air injection was stopped. The cyanide removal dropped immediately to zero. When air injection was resumed, the cyanide conversion increased to near 100% again, then began to decrease gradually.

This example demonstrates that activated carbon alone has some capacity for cyanide adsorption, that oxygen (in air) is effective to achieve a relatively low cyanide conversion (15 to 20%) over activated carbon, that the injection of the catalytic metal, copper, allows the system to achieve much higher cyanide conversion levels, and that oxygen addition is essential to maintain these high levels of cyanide conversion.

Without intending to be bound thereby, the capacity of the activated carbon for cyanide adsorption is believed to allow the effective contact time for the heterogeneous catalyst system to be much greater than that for a homogeneous catalyst system. This increased effective contact time is believed to enhance the conversion of complexed cyanide as well as free cyanide. In a similar fashion, the adsorptive properties of the activated carbon are believed to enhance the catalytic effect of the metal compound over that of an equilibrium concentration of a soluble form of the metal compound in an aqueous system.

EXAMPLE 3

Figure 3:
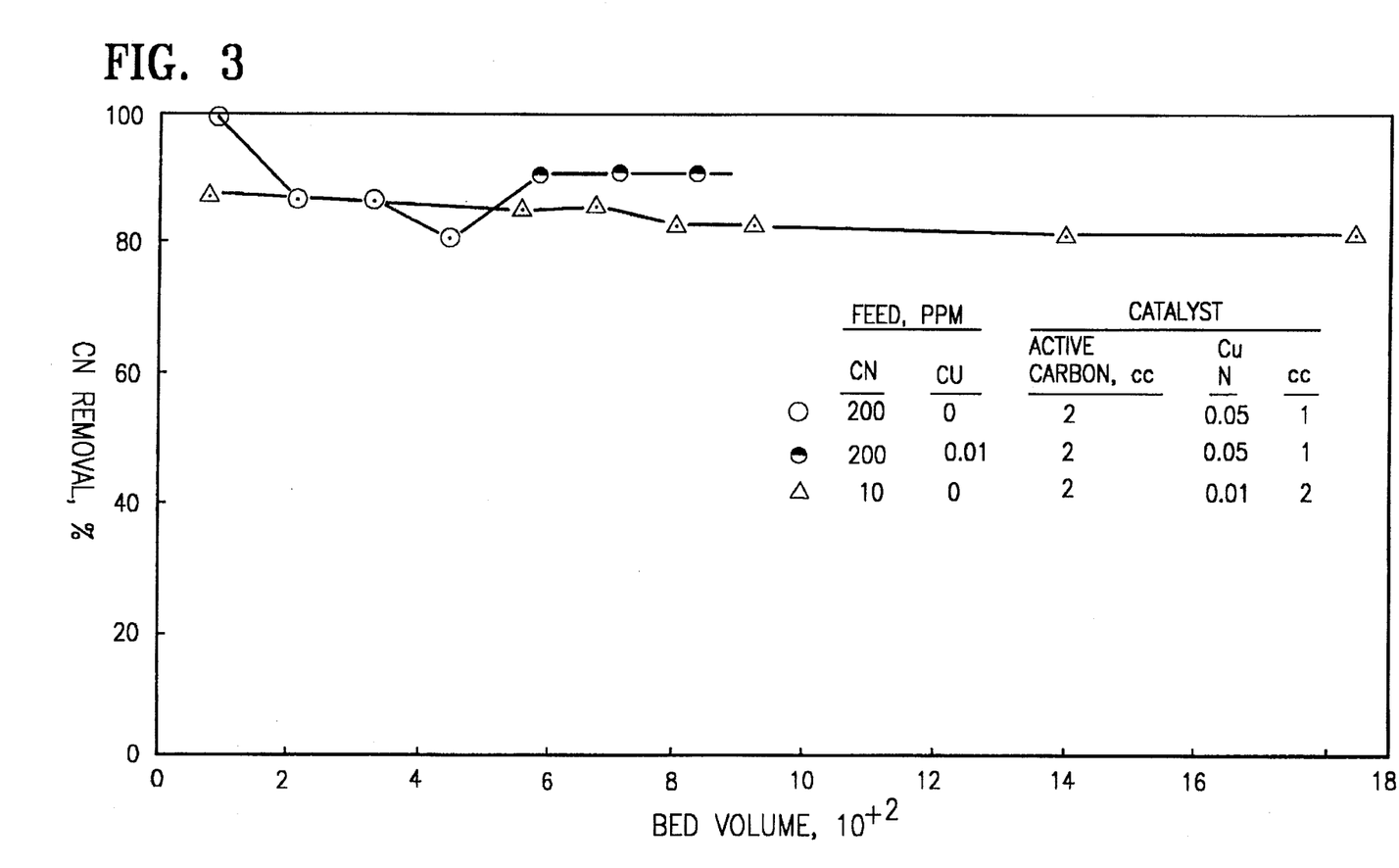
FIG. 3 is a graph demonstrating the effects of various operating parameters on cyanide removal efficiency.

In this example, 2 cc of Calgon CAL™ activated carbon, crushed to 20 by 40 mesh, was packed into a tubular reactor. Synthetic waste water was prepared from distilled water by adding $NH_4OH$ to a $NH_3$ level of 80 ppm, thiosulfate to a level of 100 ppm and sodium cyanide to a level of 200 ppm. The pH of the synthetic waste water was adjusted to 9. The system was activated by passing 1 cc of a 0.05 N $Cu(NO_3)_2$ solution in distilled water over the carbon in the reactor. The synthetic waste water containing 200 ppm cyanide was passed through the activated carbon bed at 5 $hr^{-1}$ liquid hourly space velocity (LVSH), 10 cc/hr, and 100° C. along with 300 cc/hr air. Results of this experiment are shown in FIG. 3. Cyanide concentration in the effluent water was measured using a cyanide ion selective electrode (Orion Research, Model 94-06). Cyanide removal was initially near 100%, then declined to below 80% after about 400 bed volumes of the synthetic waste water had been passed over the catalyst. At this point, the synthetic waste water passing over the carbon catalyst was adjusted to continuously contain 0.01 ppm copper and the cyanide removal increased to about 90% and remained at that level.

EXAMPLE 4

In this example, 2 cc of Calgon CAL™ activated carbon, crushed to 20 by 40 mesh, was packed into a tubular reactor. Synthetic waste water was prepared from distilled water by adding $NH_4OH$ to a $NH_3$ level of 80 ppm, thiosulfate to a level of 100 ppm and sodium cyanide to a level of 10 ppm. The pH of the synthetic waste water was adjusted to 9. The system was activated by passing 2 cc of a 0.01 N $Cu(NO_3)_2$ solution in distilled water over the carbon in the reactor. The synthetic waste water containing 10 ppm cyanide was passed through the activated carbon bed at 5 $hr^{-1}$ liquid hourly space velocity (LVSH), 10 cc/hr, and 100° C. along with 300 cc/hr air. Results of this experiment are shown in FIG. 3. Cyanide concentration in the effluent water was measured using a cyanide ion selective electrode (Orion Research, Model 94-06). Cyanide removal remained at about 85% while over about 1,800 bed volumes of the synthetic waste water passed over the catalyst.

EXAMPLE 5

In this example, 2 cc of Calgon CAL™ activated carbon, crushed to 20 by 40 mesh, was packed into a ¼ inch diameter stainless steel tube reactor. Test water containing 1 ppm $H_2S$, 19 ppm mercaptan, 225 ppm ammonia, and 6.8 ppm total cyanide (free and complexed) was obtained from a petroleum refinery. To avoid loss of cyanides in transit, caustic (NaOH) was added to raise the pH from 9.4 to 12.4, and then acid ($H_2SO_4$) was added to adjust the pH back to 9.4 before testing. The test water was passed through the activated carbon bed at 5 $hr^{-1}$ liquid hourly space velocity (LHSV), 10 cc/hr, 100° C., and 7 psig, while air was co-fed at 300 cc/hr. Copper at 0.1 ppm was continuously added to the test water before the water was passed through the reactor. Results of this test are shown in Table 1, below. The high initial copper concentrations in the treated water from this example were unexpected, especially since only a low concentration of copper was added to the test water and the initial copper concentration on the activated carbon used was found to be below about 40 ppm. A possible explanation for these high copper concentrations in the treated water is residual contamination of the test equipment from previous tests. Cyanide concentration in the effluent water was measured using a cyanide ion selective electrode (Orion Research, Model 94-06). Copper concentrations in the samples were measured using a cupric electrode (Orion Research, Model 94-29) and atomic absorption (AA). The samples were concentrated by vaporization before the AA analysis.

TABLE 1

| Bed Volumes Water Treated | Total Cyanide Removal, % | Copper in Effluent, ppm | |
| --- | --- | --- | --- |
| | | Cu Electrode | Atomic Absorption |
| 225 | 99.9 | 22.0 | — |
| 465 | 99.6 | 14.5 | — |
| 585 | — | 12.5 | — |
| 705 | — | 11.0 | — |
| 825 | 99.3 | 8.7 | 10.9 |
| 945 | 98.7 | 4.2 | — |
| 1065 | 98.7 | 4.2 | — |
| 1185 | 98.7 | 3.4 | — |

EXAMPLE 6

In this example, 2 cc of Calgon CAL™ activated carbon, crushed to 20 by 40 mesh, was packed into a ¼ inch diameter stainless steel tube reactor. The same test water as in Example 5 above was used. The test water was passed through the activated carbon bed at 5 $hr^{-1}$ liquid hourly space velocity (LHSV), 10 cc/hr, 100° C., and 7 psig, while air was co-fed at 300 cc/hr. No copper was added to the test water before the water was passed through the reactor. Results of this test are shown in Table 2, below. The high initial copper concentrations in the treated water from this example were unexpected, especially since no copper was added to the test water and the initial copper concentration on the activated carbon used was below about 40 ppm. A possible explanation for these high copper concentrations in the treated water is residual contamination of the test equipment from previous tests. Cyanide concentration in the effluent water was measured using a cyanide ion selective electrode (Orion Research, Model 94-06). Copper concentrations in the samples were measured using a cupric electrode (Orion Research, Model 94-29) and atomic absorption (AA). The samples were concentrated by vaporization before the AA analysis.

TABLE 2

| Bed Volumes Water Treated | Total Cyanide Removal, % | Copper in Effluent, ppm | |
| --- | --- | --- | --- |
| | | Cu Electrode | Atomic Absorption |
| 220 | 99.9 | 21.5 | — |
| 460 | 99.7 | 10.0 | — |
| 580 | — | 7.5 | — |
| 700 | — | 7.0 | — |
| 820 | 99.1 | 5.8 | 6.8 |
| 940 | 98.4 | 5.1 | — |
| 1060 | 98.4 | 2.5 | — |
| 1180 | 98.4 | 2.4 | — |

EXAMPLE 7

In this example, 2 cc of Calgon CAL™ activated carbon, crushed to 20 by 40 mesh, was packed into a ¼ inch diameter stainless steel tube reactor. Synthetic test water was prepared by adding NH$_4$OH to an NH$_3$ level of 80 ppm, thiosulfate to an equivalent sulfur level of 100 ppm and sodium cyanide to a CN level of 100 ppm to distilled water. First, about 700 bed volumes of the synthetic test water was passed through the reactor, then the same test water as in Example 5 above was used for the balance of the test. The test water was passed through the activated carbon bed at 5 hr$^{-1}$ liquid hourly space velocity (LHSV), 10 cc/hr, 100° C., and 7 psig, while air was co-fed at 300 cc/hr. Copper at 0.1 ppm was continuously added to the test water before the water was passed through the reactor. Results of this test are shown in Table 3, below. Also, 2,500 cc of effluent water from this test was composited from the effluent water produced between bed volumes of 1,100 and 2,500. This composite sample was found to have a total cyanide concentration (free and complex) of about 0.1 ppm and a copper concentration of about 0.5 ppm. Cyanide concentration in the effluent water was measured using a cyanide ion selective electrode (Orion Research, Model 94-06). Copper concentrations in the samples were measured using a cupric electrode (Orion Research, Model 94-29) and atomic absorption (AA). The samples were concentrated by vaporization before the AA analysis.

TABLE 3

| Bed Volumes | | Copper in Effluent, ppm | |
| --- | --- | --- | --- |
| Water Treated | Total Cyanide Removal, % | Cu Electrode | Atomic Absorption |
| 1002 | 99.2 | 1.0 | — |
| 1123 | 99.1 | 0.68 | 0.5 |
| 1243 | 99.0 | — | — |
| 1362 | 98.6 | — | — |
| 1602 | 98.6 | — | — |
| 1963 | — | 0.55 | 0.4 |
| 2142 | 98.5 | — | — |
| 2263 | 98.4 | — | — |
| 2383 | 97.7 | — | — |
| 2503 | 98.4 | 0.56 | — |

What is claimed is:

1. A method for treating waste water comprising:
   (a) directing a source of oxygen and a waste water containing at least one offensive substance selected from the group consisting of cyanide, sulfide, sulfite, thiosulfate, mercaptan, disulfide, ammonia and mixtures thereof over a high surface area, porous material having a metal compound thereon in an amount that is catalytically active to catalyze the oxidation of the offensive substance in a reaction zone under conditions effective to reduce the concentration of the offensive substance contained in the waste water and to thereby produce a treated waste water, said conditions comprising a temperature of from about 100° F. to about 400° F. and a pH of from about 6 to about 14, the catalytically active amount of the metal compound on the porous material comprising less than about 10,000 ppm;
   (b) adding sufficient amount of a soluble form of said metal compound to the waste water prior to directing the waste water over the porous material to maintain the catalytically active amount of the metal compound on the porous material and to maintain a concentration of the metal compound in the treated waste water at a level less than about 3 ppm; and
   (c) discharging the treated waste water from the reaction zone.

2. The method according to claim 1 comprising selecting the metal compound from at least one of the group consisting of copper, nickel, cobalt, molybdenum, tungsten, silver, palladium, platinum, iron, manganese, and mixtures thereof.

3. The method according to claim 1 comprising selecting the high surface area, porous material from the group consisting of porous resins, ion exchange resins, activated carbon, natural zeolites, synthetic zeolites, alumina, silica, and silica-alumina.

4. The method according to claim 1 comprising treating the catalyst with the metal compound dissolved in a solvent prior to producing treated waste water.

5. The method according to claim 1 comprising activated carbon as the high surface area, porous material.

6. The method according to claim 1 comprising directing the waste water into the reaction zone under comditions comprising a temperature of about 125° F. to about 300° F.

7. The method according to claim 1 comprising directing the waste water into the reaction zone under conditions comprising a pH of about 7.5 to about 10.5.

8. The method according to claim 1 comprising adding the soluble metal compound at a concentration of between about 1 ppm and about 0.001 ppm in the waste water.

9. The method according to claim 1 comprising intermittently adding the soluble metal compound to the waste water at a concentration sufficient to keep the metal content on the porous material high enough to be effective.

10. The method according to claim 1 comprising continuously adding the soluble metal compound to the waste water at a concentration sufficient to keep the metal content on the porous material high enough to be effective.

11. The method according to claim 1 comprising selecting copper as the metal compound.

12. The method according to claim 1 comprising at least one fixed catalyst bed as the reaction zone.

13. The method according to claim 1 comprising a slurry of the porous material in the waste water as the reaction zone.

14. The method according to claim 1 comprising treating the waste water in a single catalytic operation.

15. The method according to claim 1 comprising treating the waste water in a single oxidation step.

16. The method according to claim 1 comprising directing the source of oxygen and the waste water to flow in the same direction over the porous material.

17. The method according to claim 1 comprising directing the source of oxygen and the waste water to flow in opposite directions over the porous material.

18. The method according to claim 1 comprising selecting the high surface area porous material having about 1 ppm to about 1,000 ppm of the metal compound thereon.

19. The method according to claim 1 comprising a source of oxygen which contains no intentionally added hydrogen peroxide.

20. The method according to claim 1 comprising a waste water which contains no intentionally added SO$_2$ type compounds.

21. The method according to claim 1 comprising directing the waste water through the reaction zone at a liquid hourly space velocity of about 1 to about 100 hr$^{-1}$.

22. The method according to claim 1 comprising selecting air or oxygen enriched air as the source of oxygen.

23. A method for treating waste water comprising:
   (a) directing a source of oxygen and a waste water containing at least one offensive substance selected from the group consisting of cyanide, sulfide, sulfite, thiosulfate, mercaptan, disulfide, ammonia and mixtures thereof, upwardly through a catalyst comprising an activated carbon having an amount of copper thereon that is catalytically active to catalyze the oxidation of the offensive substance in a reaction zone under conditions effective to reduce the concentration of the offensive substance contained in the waste water and to thereby produce a treated waste water, said conditions comprising a temperature of from about 120° F. to about 250° F. and a pH of from about 8 to about 10, the catalytically active amount of copper comprising less than about 800 ppm copper on the activated carbon;

(b) adding sufficient soluble copper to the waste water prior to directing it into the reaction zone to maintain the catalytically active amount of copper on the activated carbon and to maintain a concentration of copper in the treated waste water at a level between about 1 ppm and about 0.001 ppm; and (c) discharging the treated waste water from the reaction zone.

24. The method according to claim 23 comprising maintaining the concentration of copper in the treated waste water at a level less than about 0.5 ppm.

25. The method according to claim 23 comprising adding $Cu(NO_3)_2$, to the waste water in step (b) to provide the soluble copper.

26. A method for treating waste water comprising:

(a) directing a source of oxygen and a waste water containing at least one offensive substance selected from the group consisting of cyanide, sulfide, sulfite, thiosulfate, mercaptan, disulfide, ammonia and mixtures thereof, over a catalyst comprising an activated carbon having an amount of copper thereon that is catalytically active to catalyze the oxidation of the offensive substance in a reaction zone under conditions effective to reduce the concentration of the offensive substance contained in the waste water and to thereby produce a treated waste water, said conditions comprising a temperature of from about 100° F. to about 400° F. and a pH of from about 6 to about 12, the catalytically active amount of copper on the activated carbon comprising less than about 1000 ppm;

(b) adding sufficient soluble copper to the waste water prior to directing it into the reaction zone to maintain the catalytically active amount of copper on the activated carbon and to maintain a concentration of copper in the treated waste water at a level between about 3 ppm and about 0.001 ppm; and (c) discharging the treated waste water from the reaction zone.

27. The method according to claim 1 wherein the waste water contains ammonia and at least one substance selected from the group consisting of cyanide, sulfide, sulfite, thiosulfate, mercaptan, disulfide, and mixtures thereof, wherein the metal compound is added to the waste water in an amount sufficient to replace the amount of metal compound leached from the porous material, and wherein less than about 3 ppm of the metal compound is added to the waste water.

* * * * *

UNITED STATES PATENT AND TRADEMARK OFFICE
CERTIFICATE OF CORRECTION

PATENT NO. :     5,635,078
DATED      :     June 3, 1997
INVENTOR(S) :    Tsoung Y. Yan It is certified that error appears in the above-indentified patent and that said Letters Patent is hereby corrected as shown below:

Claim 6, column 14, line 16, change the word "comditions" to --"conditions"--

Signed and Sealed this

Twenty-eighth Day of October, 1997

Attest:

BRUCE LEHMAN

Attesting Officer      Commissioner of Patents and Trademarks